(12) United States Patent
Hosotani et al.

(10) Patent No.: US 12,034,498 B2
(45) Date of Patent: Jul. 9, 2024

(54) WIRELESS POWER-RECEIVING DEVICE WITH NEAR FIELD COMMUNICATION FUNCTION

(71) Applicant: Murata Manufacturing Co., Ltd., Kyoto-fu (JP)

(72) Inventors: Tatsuya Hosotani, Nagaokakyo (JP); Takahiro Nagai, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 84 days.

(21) Appl. No.: 17/860,674

(22) Filed: Jul. 8, 2022

(65) Prior Publication Data
US 2022/0407564 A1 Dec. 22, 2022

Related U.S. Application Data

(63) Continuation of application No. PCT/JP2020/028969, filed on Jul. 29, 2020.

(30) Foreign Application Priority Data

Jan. 9, 2020 (JP) .................................. 2020-002311

(51) Int. Cl.
*H04B 5/79* (2024.01)
*H02J 7/00* (2006.01)
(Continued)

(52) U.S. Cl.
CPC .............. *H04B 5/79* (2024.01); *H02J 50/005* (2020.01); *H02J 50/12* (2016.02); *H02J 50/70* (2016.02); *H02J 7/0068* (2013.01)

(58) Field of Classification Search
CPC ...... H04B 5/0037; H02J 50/005; H02J 50/12; H02J 50/70; H02J 7/0068; H01F 38/14
See application file for complete search history.

(56) References Cited

U.S. PATENT DOCUMENTS

| 10,396,858 B2 * | 8/2019 | Greene | H04B 5/0031 |
| 2011/0115303 A1 * | 5/2011 | Baarman | H04B 5/0087 |
| | | | 307/104 |
| 2014/0370804 A1 * | 12/2014 | Dorning | H04B 5/0037 |
| | | | 455/41.1 |

FOREIGN PATENT DOCUMENTS

| JP | 2012-110154 A | 6/2012 |
| JP | 5013019 B1 | 8/2012 |

(Continued)

OTHER PUBLICATIONS

International Search Report issued in PCT/JP2020/028969; mailed Oct. 20, 2020.

*Primary Examiner* — Jeffrey M Shin
(74) *Attorney, Agent, or Firm* — Studebaker & Brackett PC

(57) ABSTRACT

A wireless power-receiving device with near field communication function includes a communication antenna on a flat surface for near field communication, an interface circuit connected to the antenna and allowing a signal in the near field communication to pass, a wireless communication IC that is connected to the interface circuit and processes the signal, a receiving coil on the flat surface, a resonant capacitor included, with the receiving coil, in a receiving resonant circuit, and a rectifying/smoothing circuit connected to the receiving resonant circuit. The receiving resonant circuit resonates at a frequency for the near field communication, a resonance current flowing through the receiving resonant circuit causes a current to flow through the coil, a main flux is generated near the coil, and a magnetic path of the main flux is isolated from a magnetic path of a magnetic flux for the near field communication interlinking with the antenna.

20 Claims, 13 Drawing Sheets

(51) Int. Cl.
*H02J 50/00* (2016.01)
*H02J 50/12* (2016.01)
*H02J 50/70* (2016.01)

(56) References Cited

FOREIGN PATENT DOCUMENTS

WO  2014/167881 A1  10/2014
WO  2017/094355 A1  6/2017

* cited by examiner

WIRELESS POWER-RECEIVING DEVICE WITH NEAR FIELD COMMUNICATION FUNCTION

CROSS-REFERENCE TO RELATED APPLICATIONS

This application claims benefit of priority to International Patent Application No. PCT/JP2020/028969, filed Jul. 29, 2020, and to Japanese Patent Application No. 2020-002311, filed Jan. 9, 2020, the entire contents of each are incorporated herein by reference.

BACKGROUND

Technical Field

The present disclosure relates to a wireless power-receiving device with near field communication function.

Background Art

Japanese Patent No. 5013019 discloses a small non-contact charging module that is configured as a module including a non-contact charging coil, a NFC antenna, and magnetic sheets and that is capable of communication and power transmission. Japanese Patent No. 5013019 discloses the non-contact charging module including the charging coil, the NFC coil disposed in such a manner as to surround the charging coil, a first magnetic sheet that supports the charging coil, and a second magnetic sheet that is placed on the first magnetic sheet and that supports the NFC coil.

SUMMARY

The non-contact charging module described in Japanese Patent No. 5013019 has the coil for non-contact charging, the magnetic substance for non-contact charging, the coil for NFC, and the magnetic substance for NFC that are integrated into one, and thus the integration helps a mobile terminal to be downsized in incorporating the non-contact charging module in the mobile terminal.

However, in the non-contact charging module described in Japanese Patent No. 5013019, the coil and the magnetic substance for the non-contact charging are substantially independent from the coil and the magnetic substance for the NFC communication, and thus the non-contact charging module does not exert organic coordination in electrical characteristics and magnetic characteristics, except the structural downsizing.

Accordingly, the present disclosure provides a wireless power-receiving device with near field communication function that has a near field communication function and a wireless power-receiving function and that restrains interference between the functions.

A wireless power-receiving device with near field communication function taken as an example of the present disclosure includes a communication antenna for near field communication laid on a flat surface; an interface circuit that is connected to the communication antenna and that allows a signal in the near field communication to pass; a wireless communication IC that is connected to the interface circuit and that processes the signal in the near field communication; a receiving coil laid on the flat surface; a resonant capacitor included, together with the receiving coil, in a receiving resonant circuit; and a rectifying/smoothing circuit connected to the receiving resonant circuit. The receiving resonant circuit resonates at a frequency for the near field communication, a resonance current flowing through the receiving resonant circuit causes a current to flow through the receiving coil, a main flux is generated, and a magnetic path of the main flux is isolated from a magnetic path of a magnetic flux for the near field communication, the magnetic flux interlinking with the communication antenna.

According to the configuration described above, since the receiving resonant circuit resonates at the frequency for the near field communication, the receiving coil receives the magnetic flux for the near field communication generated from a counterpart communication antenna, and power may be received. Moreover, the interference between a near field communication function and a wireless power-receiving function is restrained.

The present disclosure provides a wireless power-receiving device with near field communication function that includes the near field communication function and the wireless power-receiving function and moreover that restrains electromagnetic interference between the functions. Since the electromagnetic interference between the near field communication function and the wireless power-receiving function can be restrained, the functions can be designed independently in such a manner that parameters appropriate for each function are set. After the independent designing, the functions can be integrated into one in such a manner as to be combined and then connected to each other. This exerts effects of enabling development and designing processes to be considerably simplified.

DETAILED DESCRIPTION

Figure 1:
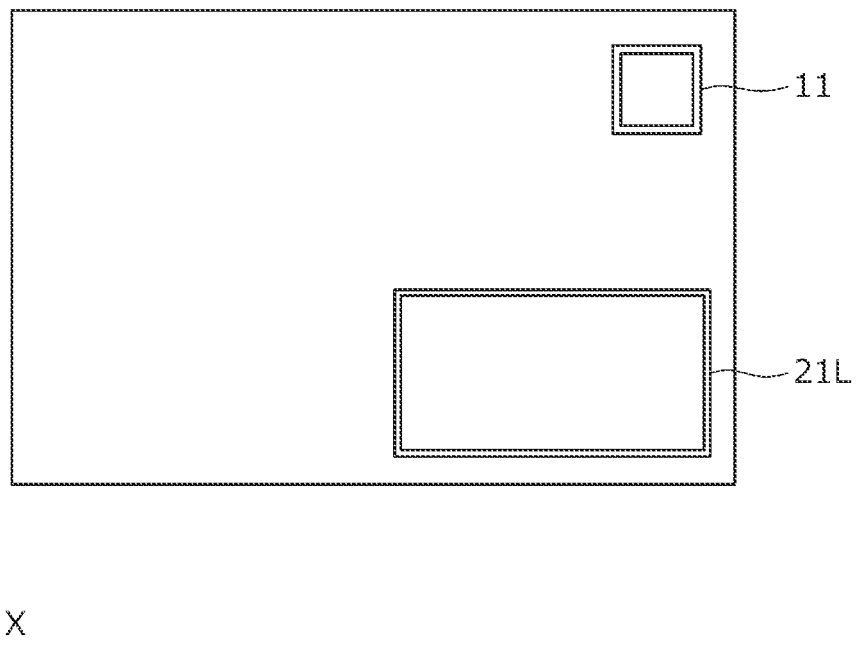
FIG. 1 is a plan view illustrating the structure of a communication antenna and a receiving coil included in a wireless power-receiving device with near field communication function according to a first embodiment.

Hereinafter, a plurality of embodiments for implementing the present disclosure are described by taking some specific examples with reference to the drawings. The same components are denoted by the same reference numerals throughout the drawings. The embodiments are described conveniently in such a manner as to be divided in consideration of explanation of the gist of the disclosure and easy understanding, but the configurations in the respective different embodiments may be partially replaced or combined with each other. In a second embodiment and succeeding embodiments, description of matters common to the first embodiment is omitted, and only different points are described. In particular, the same operations and effects exerted by the configurations are not referred to one by one on an embodiment basis.

First Embodiment

FIG. 1 is a plan view illustrating the structure of a communication antenna and a receiving coil included in a wireless power-receiving device with near field communication function according to a first embodiment. In FIG. 1, a communication antenna 11 is a NFC communication antenna, and a receiving coil 21L is a receiving coil for wireless power receiving. The communication antenna 11 and the receiving coil 21L are laid on the flat surface. The communication antenna 11 is configured from a spiral square coil conductor wound with a plurality of turns. The receiving coil 21L is also configured from a spiral square coil conductor wound with a plurality of turns.

The wireless power-receiving device with near field communication function may include a magnetic substance near the communication antenna 11. The magnetic substance forms part of the magnetic path of a magnetic flux interlinking with the communication antenna 11. The wireless power-receiving device with near field communication function may also include a magnetic substance near the receiving coil 21L. The magnetic substance forms part of the magnetic path of a magnetic flux interlinking with the receiving coil 21L. These magnetic substances will be exemplified later.

The communication antenna 11 and the receiving coil 21L illustrated in FIG. 1 are disposed on a card electronic device, for example, of a credit card size. That is, the wireless power-receiving device with near field communication function is configured as the card electronic device. In the receiving coil 21L illustrated in FIG. 1, not all sides of the receiving coil 21L are disposed near the outline (four sides) of the card electronic device, but only two sides thereof are disposed near the corresponding sides of the outline of the card electronic device.

A current flowing through the receiving coil 21L (a resonance current flowing through a receiving resonant circuit to be described later) causes a current to flow through the receiving coil 21L, a main flux is generated near the receiving coil 21L, and the magnetic path of the main flux is isolated from a magnetic path of a magnetic flux for the near field communication interlinking with the communication antenna 11. In the example in the example illustrated in FIG. 1, the communication antenna 11 is located not to neighbor the receiving coil 21L. The resonance current flowing through the receiving resonant circuit causes the current to flow through the receiving coil 21L, the main flux is generated near the receiving coil 21L, and the magnetic path of the main flux is isolated from the magnetic path of the magnetic flux for communication interlinking with the communication antenna 11.

In a case where this card electronic device is used, the NFC communication is performed in such a manner that the card electronic device is held out over the communication antenna of a NFC communication device (a counterpart communication antenna) (described later). In addition, wireless power receiving is performed in such a manner that the card electronic device is held out over the transmitting coil of the power-transmitting device.

Figure 2:
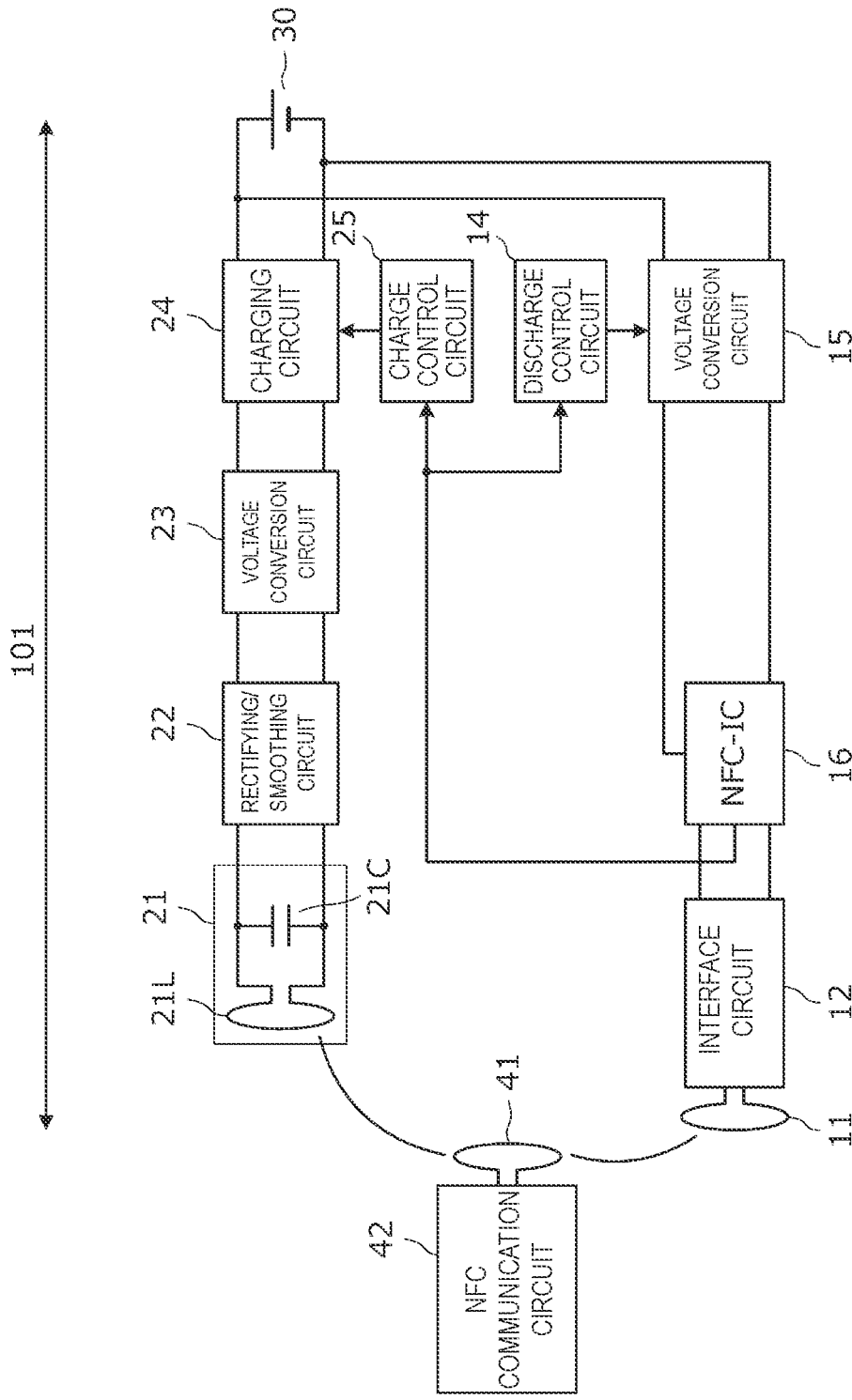
FIG. 2 is a block diagram illustrating the configuration of a wireless power-receiving system including a wireless power-receiving device with near field communication function according to the first embodiment.

FIG. 2 is a block diagram illustrating the configuration of a wireless power-receiving system including a wireless power-receiving device with near field communication function 101 according to the first embodiment. In the state illustrated in FIG. 2, a near field communication system includes the wireless power-receiving device with near field communication function 101, a counterpart communication antenna 41, and a NFC communication circuit 42.

The wireless power-receiving device with near field communication function 101 includes the communication antenna 11, an interface circuit 12 that is connected to the communication antenna 11 and that allows a signal in NFC communication to pass, and a NFC-IC 16 that is connected to the interface circuit 12 and that processes the signal in NFC communication.

The wireless power-receiving device with near field communication function 101 also includes the receiving coil 21L, a resonant capacitor 21C included, together with the receiving coil 21L, in a receiving resonant circuit 21, and a rectifying/smoothing circuit 22 connected to the receiving resonant circuit 21.

The wireless power-receiving device with near field communication function 101 also includes a voltage conversion circuit 23 connected to the output part of the rectifying/smoothing circuit 22, a charging circuit 24, a secondary battery 30, a charge control circuit 25, a discharge control circuit 14, and a voltage conversion circuit 15.

The voltage conversion circuit 23 is configured from, for example, a DC-DC converter and converts a voltage output from the rectifying/smoothing circuit 22 to a voltage required by the charging circuit 24. The charging circuit 24 charges the secondary battery 30 with the output voltage from the voltage conversion circuit 23. The voltage conversion circuit 15 converts an electromotive voltage from the secondary battery 30 to a predetermined voltage and supplies the NFC-IC 16 with the predetermined voltage as a power supply voltage.

In accordance with a control signal output from the NFC-IC 16, the charge control circuit 25 controls the operation of the charging circuit 24, that is, whether to enable or disable the operation. For example, charging is stopped in a state where NFC communication is performed, and charging is performed in a state where the NFC communication is not performed.

In accordance with a control signal output from the NFC-IC 16, the discharge control circuit 14 controls the operation of the voltage conversion circuit 15, that is, whether to enable or disable the operation. For example, the voltage conversion circuit 15 is enabled to operate in the state where the NFC communication is performed, and the voltage conversion circuit 15 is disabled to stop discharging in the state where the NFC communication is not performed.

In the state illustrated in FIG. 2, the counterpart communication antenna 41 for NFC communication and the communication antenna 11 have magnetic field coupling therebetween, and the NFC communication is performed between the NFC communication circuit 42 and the NFC-IC 16. The counterpart communication antenna 41 also has magnetic field coupling to the receiving coil 21L. Resonant frequencies for the receiving resonant circuit 21 correspond to a 13.56 MHz band serving as frequencies for a NFC communication signal. The impedance of the receiving resonant circuit 21 at the frequencies for the NFC communication signal is ½ or less of the impedance of the interface circuit 12 at the frequencies for the NFC communication signal. Power of the NFC communication signal can thus be received with high efficiency.

Figure 3:
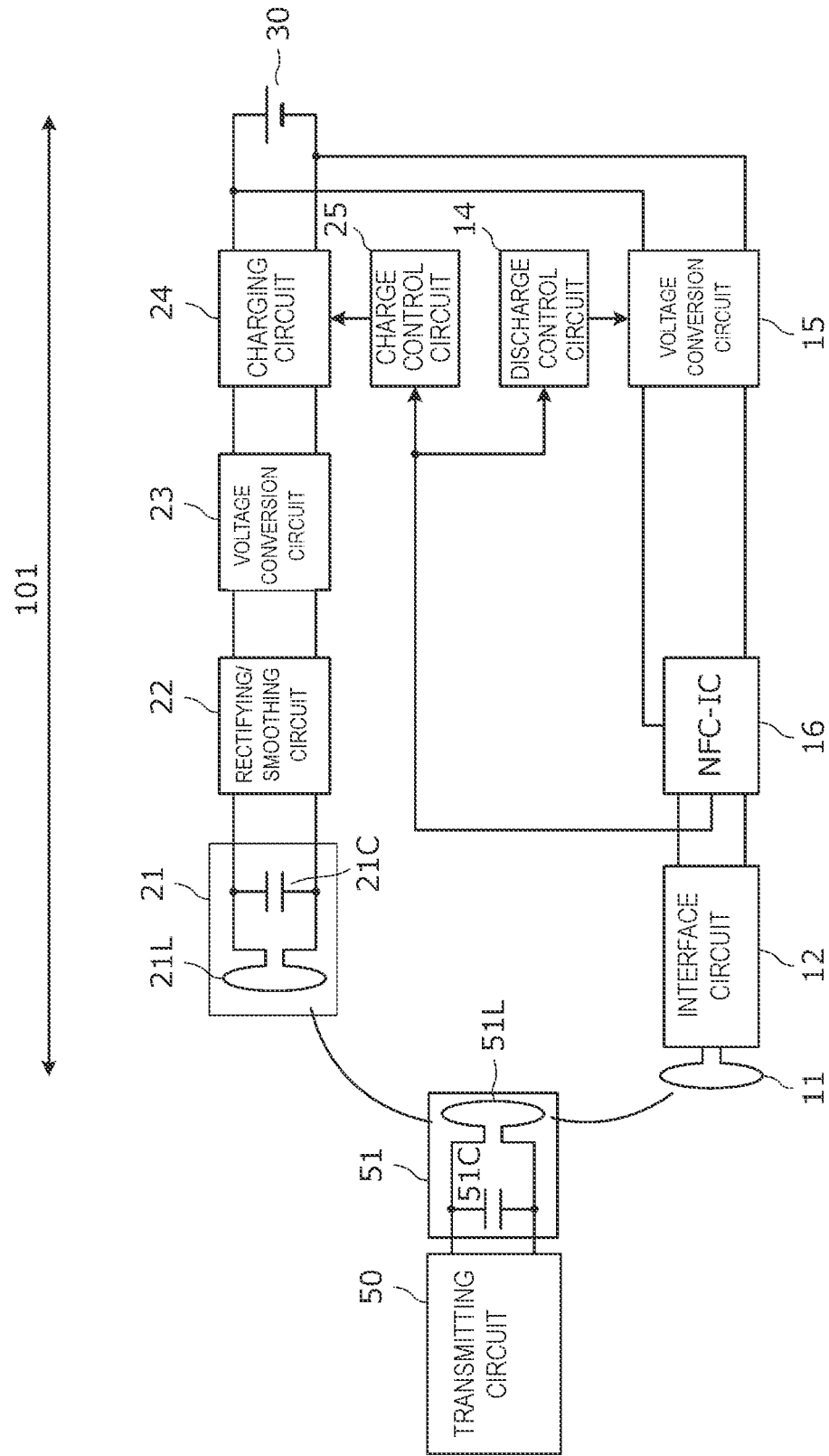
FIG. 3 is a block diagram illustrating the configuration of a wireless power-receiving system including the wireless power-receiving device with near field communication function according to the first embodiment.

FIG. 3 is a block diagram illustrating the configuration of a wireless power-receiving system including the wireless power-receiving device with near field communication function 101 according to the first embodiment. In the state illustrated in FIG. 3, a near field communication system includes the wireless power-receiving device with near field communication function 101, a transmitting circuit 50, and a transmitting resonant circuit 51. The transmitting resonant circuit 51 includes a transmitting coil 51L and a resonant capacitor 51C. The wireless power-receiving device with near field communication function 101 has the same configuration as that of the wireless power-receiving device with near field communication function 101 illustrated in FIG. 2. That is, the example in FIG. 3 illustrates the state where the wireless power-receiving device with near field communication function 101 is disposed near the transmitting coil 51L. The transmitting coil 51L has magnetic field coupling to the receiving coil 21L in this state. The receiving resonant circuit 21 is coupled to the transmitting resonant circuit 51 and magnetically resonates, and power is received from the transmitting circuit 50 by a receiving circuit including the rectifying/smoothing circuit 22, the voltage conversion circuit 23, the charging circuit 24, and other components.

In the state illustrated in FIG. 3, the transmitting coil 51L also has magnetic field coupling to the communication antenna 11, but the NFC-IC 16 does not perform NFC communication. In this state, the charge control circuit 25 does not receive a control signal from the NFC-IC 16, and the charging circuit 24 is enabled. The secondary battery 30 is thus charged with power wirelessly received from the transmitting circuit 50. Further, the discharge control circuit 14 does not receive a control signal from the NFC-IC 16, and the voltage conversion circuit 15 is disabled. Unnecessary discharging from the secondary battery 30 is thus restrained.

Figure 4:
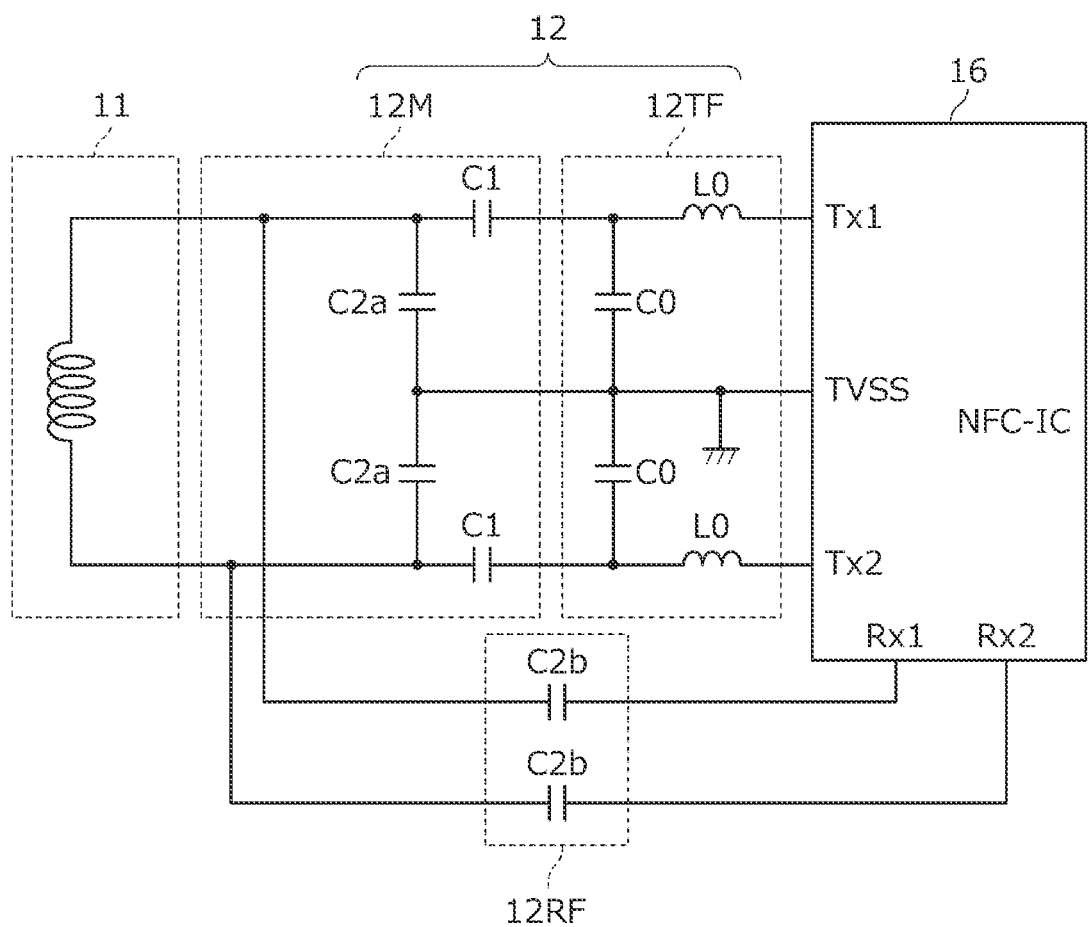
FIG. 4 is a view illustrating an example circuit configuration ranging from a NFC-IC to a communication antenna in the wireless power-receiving device with near field communication function.

FIG. 4 is a view illustrating an example circuit configuration ranging from the NFC-IC 16 to the communication antenna 11 in the wireless power-receiving device with near field communication function 101. In FIG. 4, the interface circuit 12 includes a matching circuit 12M, a transmission filter 12TF, and a reception filter 12RF. The NFC-IC 16 includes transmission signal terminals Tx1 and Tx2, reception signal terminals Rx1 and Rx2, and a ground terminal TVSS. The NFC-IC 16 performs modulation and demodulation between a baseband signal and a high-frequency signal. The NFC-IC 16 also inputs and outputs data including communication data.

The transmission filter 12TF is a filter for eliminating EMI including inductors L0 and capacitors C0. The transmission filter 12TF reduces outgoing noise generated from the NFC-IC 16 and incoming noise to the NFC-IC 16 and allows a transmission signal in the NFC frequency band to pass. The reception filter 12RF includes capacitors C2b and allows a NFC reception signal to pass. The matching circuit 12M is a matching circuit including capacitors C1 and C2a and performs matching between the impedance of the NFC-IC 16 and the impedance of the communication antenna 11, with the transmission filter 12TF interposed therebetween.

Disposing a resistive component in the circuit configuration ranging from the NFC-IC 16 to the communication antenna 11 can lead to an increase of input impedance and thus a reduction of outgoing noise generated from the NFC-IC 16 and incoming noise to the NFC-IC 16, but this is not illustrated in FIG. 4.

Figure 5:
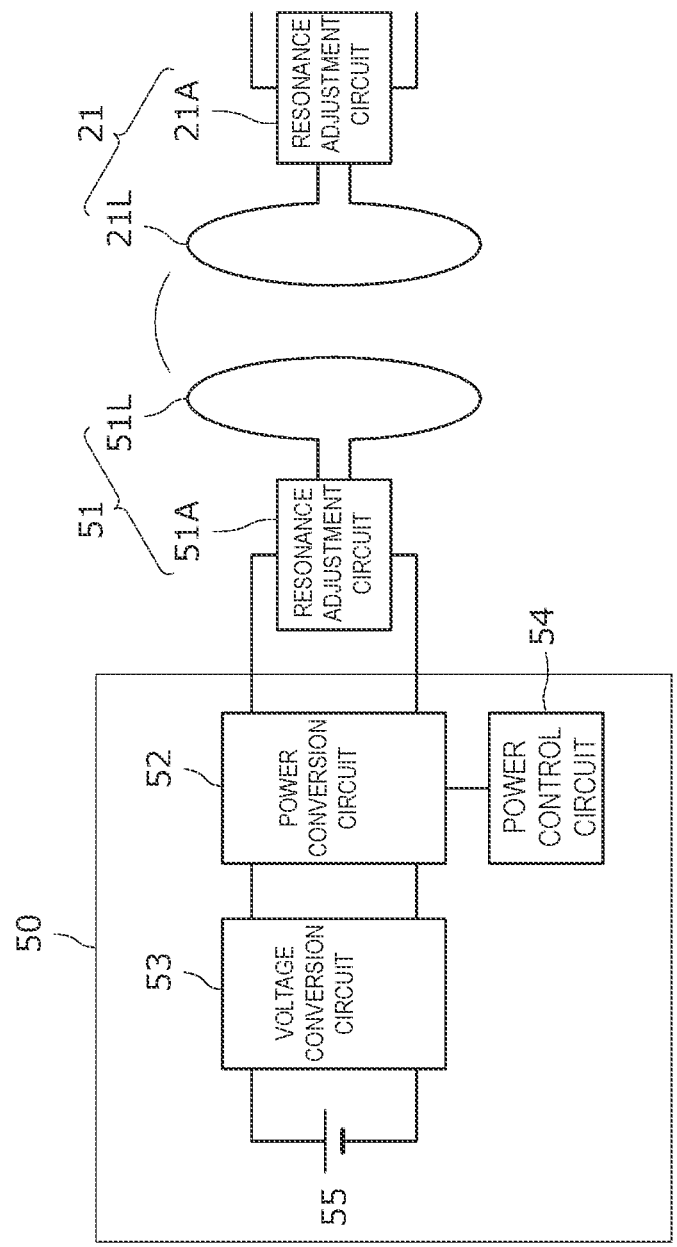
FIG. 5 is a view illustrating an example configuration of a transmitting circuit illustrated in FIG. 3.

FIG. 5 is a view illustrating an example configuration of the transmitting circuit 50 illustrated in FIG. 3. The transmitting circuit 50 includes a direct-current power supply 55, a voltage conversion circuit 53, a power conversion circuit 52, and a power control circuit 54. The voltage conversion circuit 53 converts a voltage from the direct-current power supply 55 to a voltage suitable for the power conversion circuit 52. The power conversion circuit 52 is controlled by the power control circuit 54 and supplies the transmitting resonant circuit 51 with transmission power.

In FIG. 5, the transmitting resonant circuit 51 includes the transmitting coil 51L and a resonance adjustment circuit 51A. The resonance adjustment circuit 51A corresponds to the resonant capacitor 51C or the like illustrated in FIG. 3. The resonance adjustment circuit 51A and the transmitting coil 51L form a resonant circuit, and the receiving coil 21L and a resonance adjustment circuit 21A form the receiving resonant circuit 21. The resonance adjustment circuit 21A corresponds to the resonant capacitor 21C or the like illustrated in FIG. 3.

The transmitting resonant circuit 51 and the receiving resonant circuit 21 resonate with each other to result in electromagnetic field resonance. Power is thus transmitted wirelessly by a so-called direct current resonance method.

The resonance adjustment circuit 21A and the receiving resonant circuit 21 that are connected to the receiving coil 21L are not provided for communication and thus do not require a resistive component that reduces outgoing noise and incoming noise. Resistive components in circuit configuration are sufficiently reduced, and thus input impedance can be lowered. This results in low consumption of electric energy and magnetic energy. The electric energy converted from the magnetic energy obtained via the receiving coil 21L can be stored in the receiving resonant circuit, which provides a wide communication range.

Figure 6:
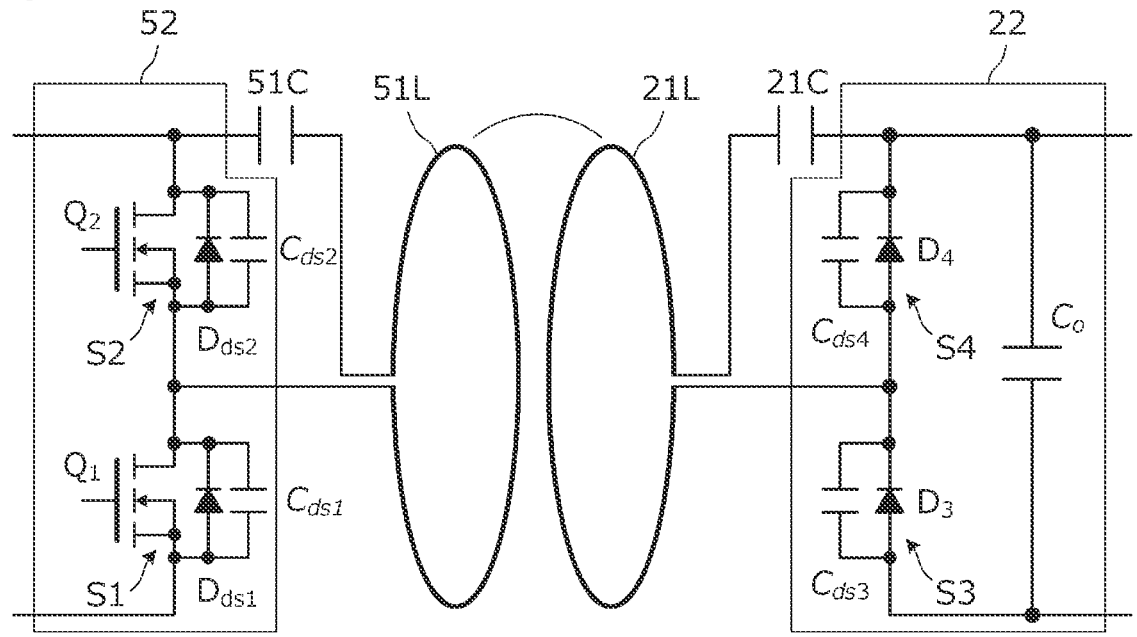
FIG. 6 is a view illustrating an example circuit configuration of a power conversion circuit and a rectifying/smoothing circuit that are illustrated in FIG. 5.

FIG. 6 is a view illustrating an example circuit configuration of the power conversion circuit 52 illustrated in FIG. 5 and the rectifying/smoothing circuit 22. The power conversion circuit 52 includes a first switch circuit S1 and a second switch circuit S2, the first switch circuit S1 being equivalently configured from a switching element Q1 and a parallel connection circuit including a diode Dds1 and a capacitor Cds1, the second switch circuit S2 being equivalently configured from a switching element Q2 and a parallel connection circuit including a diode Dds2 and a capacitor Cds2.

A signal from the power control circuit 54 (FIG. 5) causes switching between the switching elements Q1 and Q2. Turning on and off are alternately performed between the switching element Q1 of the first switch circuit S1 and the switching element Q2 of the second switch circuit S2.

The switching elements Q1 and Q2 are each a switching element such as a MOSFET having parasitic output capacitance and a parasitic diode, and the switch circuits S1 and S2 are configured by using the parasitic output capacitance and the parasitic diode.

The switching control circuit described above performs switching between the first switching element Q1 and the second switching element Q2 at a predetermined operating frequency, thereby intermittently applies a direct-current voltage to a power-transmission/resonance mechanism, and thus causes the power-transmission/resonance mechanism to generate a resonance current. This causes a voltage between both ends of each of the first switch circuit S1 and the second switch circuit S2 to have a waveform of a sinusoidal wave of a half wave every half period. Specifically, the switching operation is performed at 13.56 MHz used for the NFC communication.

The receiving circuit includes the receiving coil 21L, the receiving resonant circuit configured from the resonant capacitor 21C, and the rectifying/smoothing circuit 22. The rectifying/smoothing circuit 22 includes a third switch circuit S3 and a fourth switch circuit S4, the third switch circuit S3 including a parallel connection circuit equivalently configured from a diode D3 and a capacitor Cds3, the fourth switch circuit S4 including a parallel connection circuit equivalently configured from a diode D4 and a capacitor Cds4.

The third switch circuit S3 and the fourth switch circuit S4 rectify a voltage generated in the receiving resonant circuit configured from the receiving coil 21L and the resonant capacitor 21C, and a capacitor Co smooths the voltage. In this example, the receiving coil 21L and the resonant capacitor 21C form a series resonant circuit.

Figure 7:
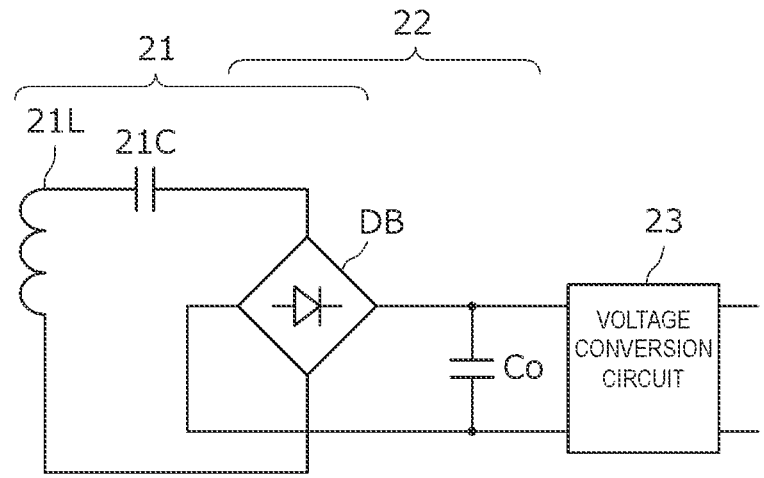
FIG. 7 is a view illustrating another example configuration of the rectifying/smoothing circuit.

FIG. 7 is a view illustrating another example configuration of the rectifying/smoothing circuit 22. The input part of a diode bridge circuit DB may be connected to the receiving resonant circuit 21, and the capacitor Co for smoothing may be connected to the output part of the diode bridge circuit DB in this manner.

Figure 8:
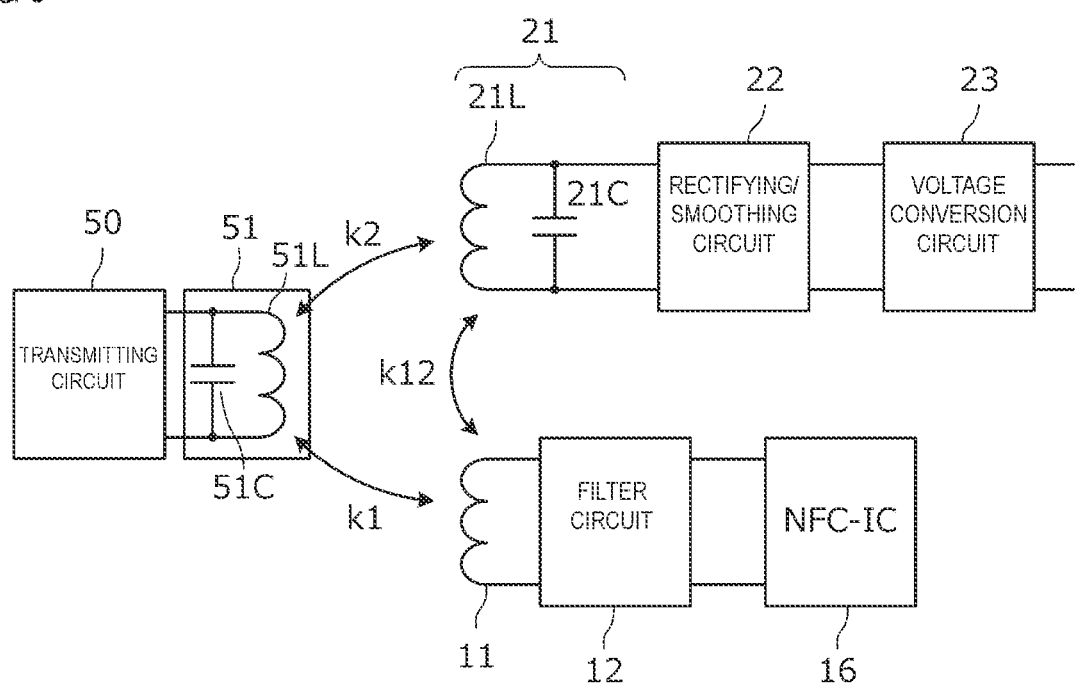
FIG. 8 is a view illustrating a relationship among coefficients of coupling between a transmitting coil, the communication antenna, and a receiving coil.

FIG. 8 is a view illustrating a relationship among coefficients of coupling between the transmitting coil 51L, the communication antenna 11, and the receiving coil 21L. In a case where a coefficient of coupling between the transmitting coil 51L and the communication antenna 11, a coefficient of coupling between the transmitting coil 51L and the receiving coil 21L, and a coefficient of coupling between the communication antenna 11 and the receiving coil 21L are respectively expressed as k1, k2, and k12, a relationship of k12<k1 holds true. In addition, a relationship of k12<k2 holds true.

According to the relationships above, the communication antenna 11 is mainly coupled to the transmitting coil 51L and is not tightly coupled to the receiving coil 21L.

Figure 9A:
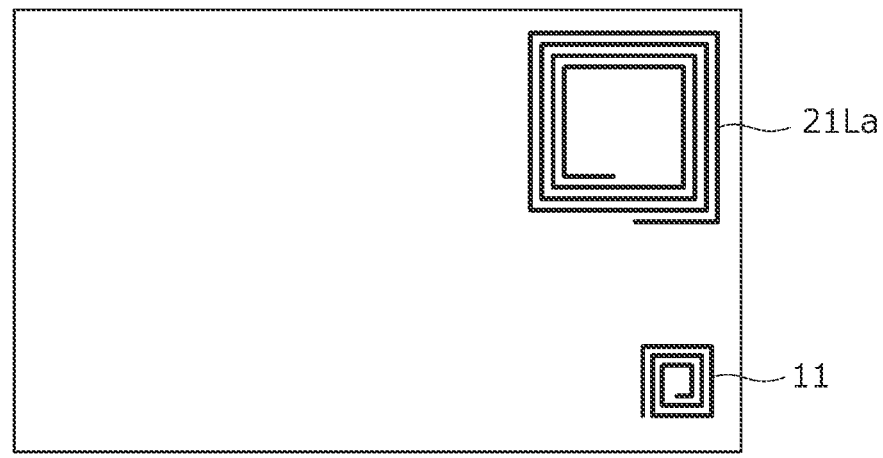
FIGS. 9A and 9B are each a view illustrating the configuration of a corresponding one of receiving coils and the communication antenna, the configuration being for simulating a relationship between a location relationship of the communication antenna with the receiving coil and a coefficient of coupling between the communication antenna and the receiving coil.
Figure 9B:
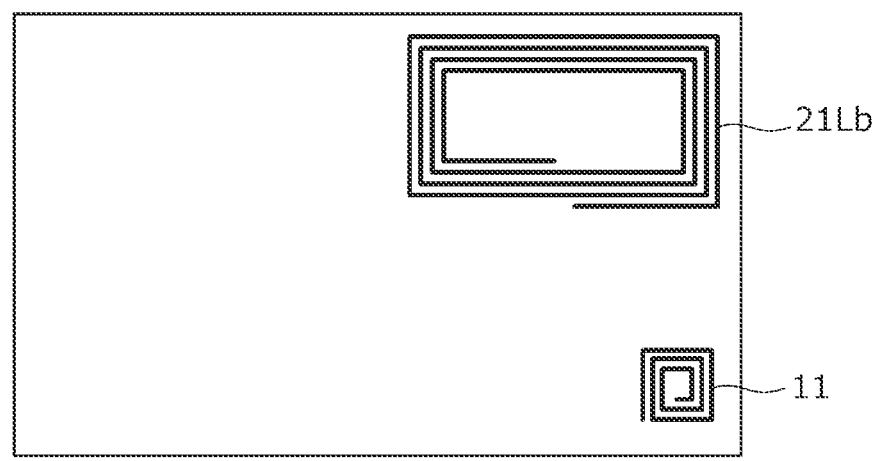

FIGS. 9A and 9B are each a view illustrating the configuration of a corresponding one of receiving coils 21La and 21Lb and the communication antenna 11, the configuration being for simulating a relationship between a location relationship of the communication antenna 11 with the receiving coil 21La or 21Lb and the coefficient of coupling k12 between the communication antenna 11 and the receiving coil 21La or 21Lb. The specifications of the communication antenna 11 and the receiving coils 21La and 21Lb are as follows.

[Communication Antenna 11]
Outer size: 8.4 mm×8.4 mm
Wiring width: 0.15 mm
Wiring pitch: 0.2 mm
The number of turns: 13
[Receiving Coil 21La]
Outer size: 20 mm×20 mm
Wiring width: 0.8 mm
Wiring pitch: 1.2 mm
The number of turns: 4
[Receiving Coil 21Lb]
Outer size: 20 mm×40 mm
Wiring width: 0.8 mm
Wiring pitch: 1.2 mm
The number of turns: 4

Figure 10:
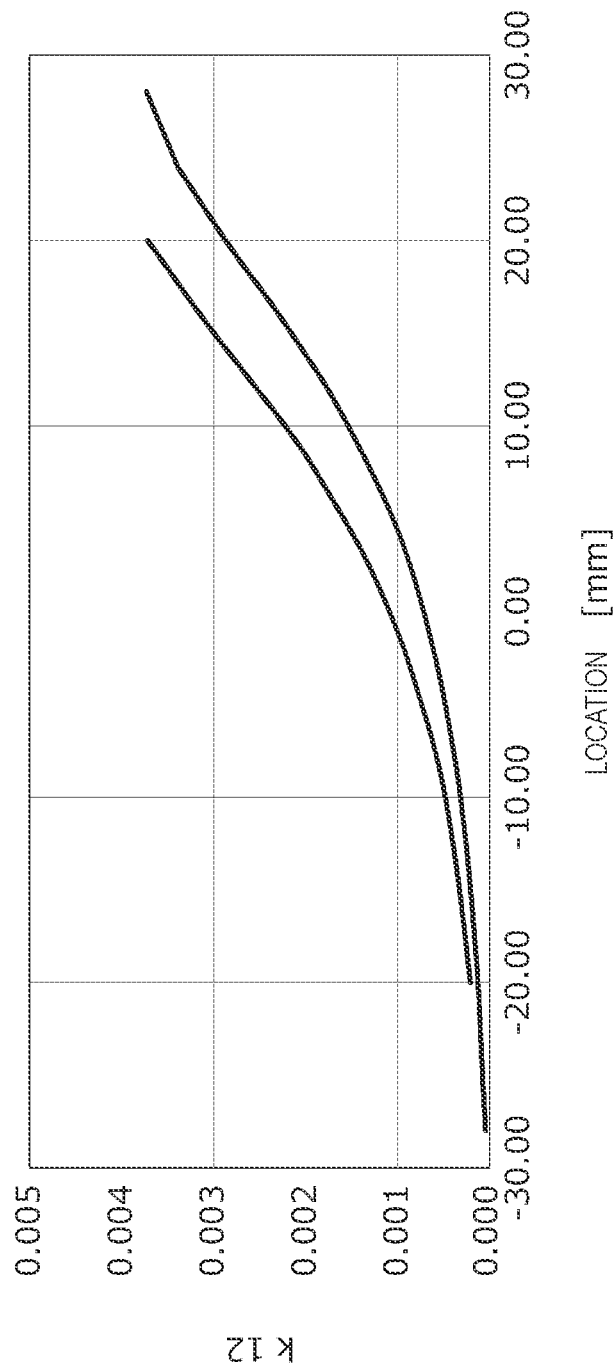
FIG. 10 is a graph illustrating changes of the coefficient of coupling with the movement of the receiving coils from a corner portion of a base material toward the center thereof, with the communication antenna being disposed in a corner portion of the base material as illustrated in FIGS. 9A and 9B.

FIG. 10 is a graph illustrating changes of the coefficient of coupling k12 with the movement of the receiving coils 21La and 21Lb from a corner portion of a base material toward the center thereof, with the communication antenna 11 being disposed in a corner portion of the base material as illustrated in FIGS. 9A and 9B.

Each of the coefficients of coupling k12 between the communication antenna 11 and a corresponding one of the receiving coils 21La and 21Lb increases as the receiving coil 21La or 21Lb approaches the communication antenna 11.

To satisfy the relationship of k12<k1, the communication antenna 11 and the receiving coil 21La or 21Lb are preferably disposed in respective different corner portions of the base material on which the communication antenna 11 and the receiving coil 21La or 21Lb are disposed. In addition, the communication antenna 11 and the receiving coil 21La or 21Lb are more preferably disposed on the base material in a location relationship having a longer distance therebetween.

According to this embodiment, a near field communication function and a wireless power-receiving function may be provided as respective independent functions. The wireless power-receiving device with near field communication function may thus be configured without changing the characteristics of each of the near field communication function and the wireless power-receiving function. For example, a distance in which communication for near field communication is available can be limited easily without interference due to the configuration for the wireless power-receiving function.

Second Embodiment

In a second embodiment, wireless power-receiving devices with near field communication function each including the communication antenna 11 and a magnetic substance near a corresponding one of the receiving coils 21La and 21Lb will be described.

Figure 11:
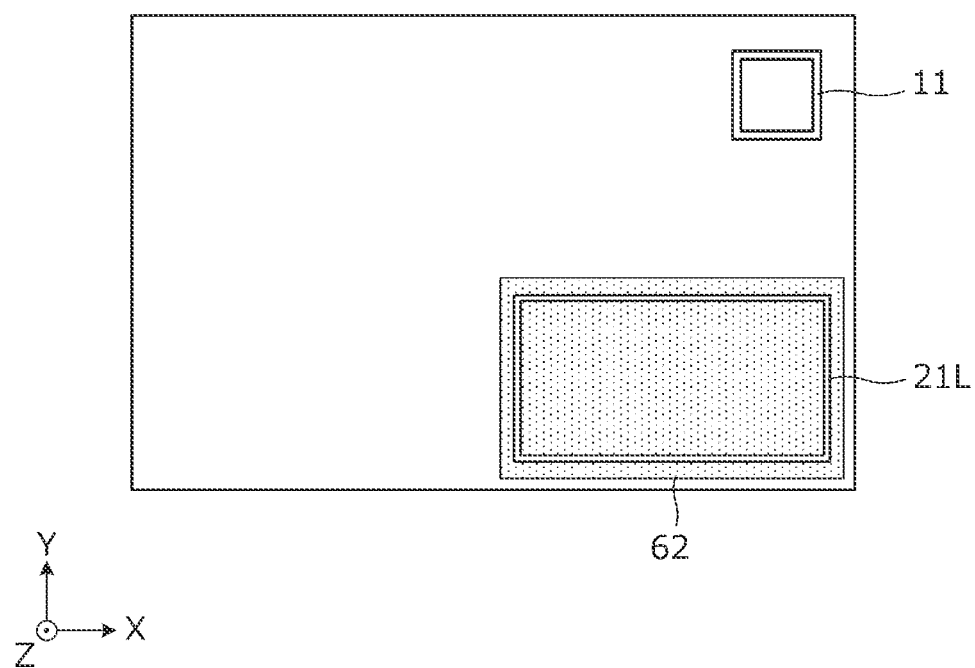
FIG. 11 is a plan view illustrating the structure of the communication antenna and the receiving coil included in a wireless power-receiving device with near field communication function according to a second embodiment.

FIG. 11 is a plan view illustrating the structure of the communication antenna and the receiving coil included in a wireless power-receiving device with near field communication function according to the second embodiment. In FIG. 11, the communication antenna 11 is a NFC communication antenna, and the receiving coil 21L is a receiving coil for wireless power receiving. The communication antenna 11 and the receiving coil 21L are laid on the flat surface. The communication antenna 11 is configured from a spiral square coil conductor wound with a plurality of turns. The receiving coil 21L is also configured from a spiral square coil conductor wound with a plurality of turns. Unlike the example illustrated in FIG. 1, in this example, a receiving-coil magnetic sheet 62 is disposed in contact with the surface of the receiving coil 21L.

In FIG. 11, the surface in the +Z direction faces the counterpart communication antenna 41 or the transmitting coil 51L. The receiving-coil magnetic sheet 62 is formed, for example, by shaping magnetic ferrite into a flexible sheet. The receiving-coil magnetic sheet 62 is not in contact with the communication antenna 11.

According to this configuration, since the receiving-coil magnetic sheet 62 acts as part of the magnetic path of a magnetic flux interlinking with the receiving coil 21L, the magnetic flux passing through the coil aperture of the receiving coil 21L is restrained from spreading, and thus the coefficient of coupling k12 between the communication antenna 11 and the receiving coil 21L is low. In addition, since the receiving-coil magnetic sheet 62 acts as part of the magnetic path of the magnetic flux interlinking with the receiving coil 21L, a coefficient of coupling between the receiving coil 21L and the counterpart communication antenna 41 (FIG. 2) or the coefficient of coupling k2 (FIG. 8) between the receiving coil 21L and the transmitting coil ML (FIG. 3) is improved.

Figure 12A:
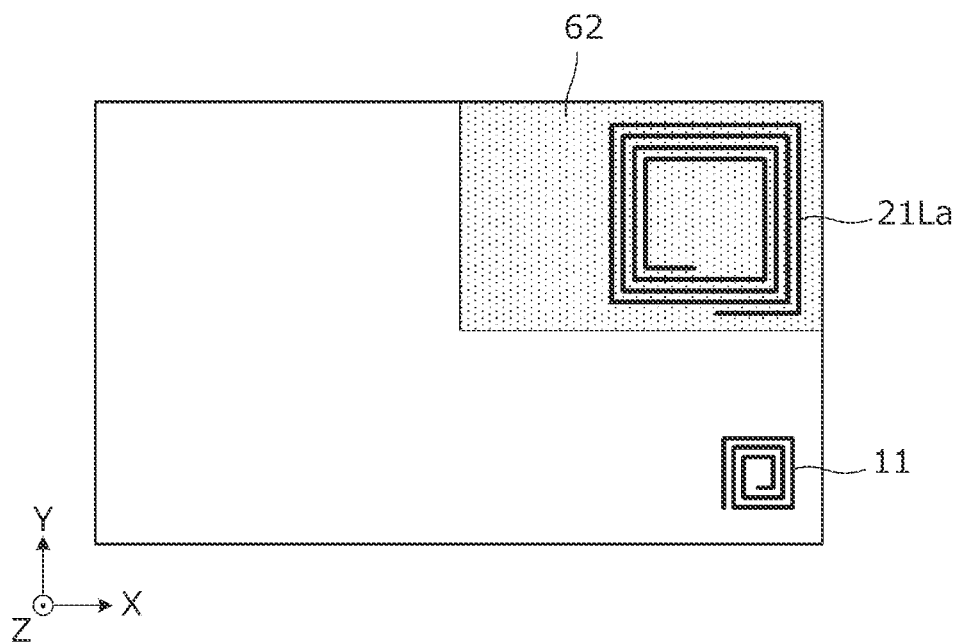
FIGS. 12A and 12B are each a view illustrating the configuration of a corresponding one of the receiving coils and the communication antenna each of which is included in the wireless power-receiving device with near field communication function according to the second embodiment, the configuration being for simulating a relationship between a location relationship of the communication antenna with the receiving coil and the coefficient of coupling between the communication antenna and the receiving coil.
Figure 12B:
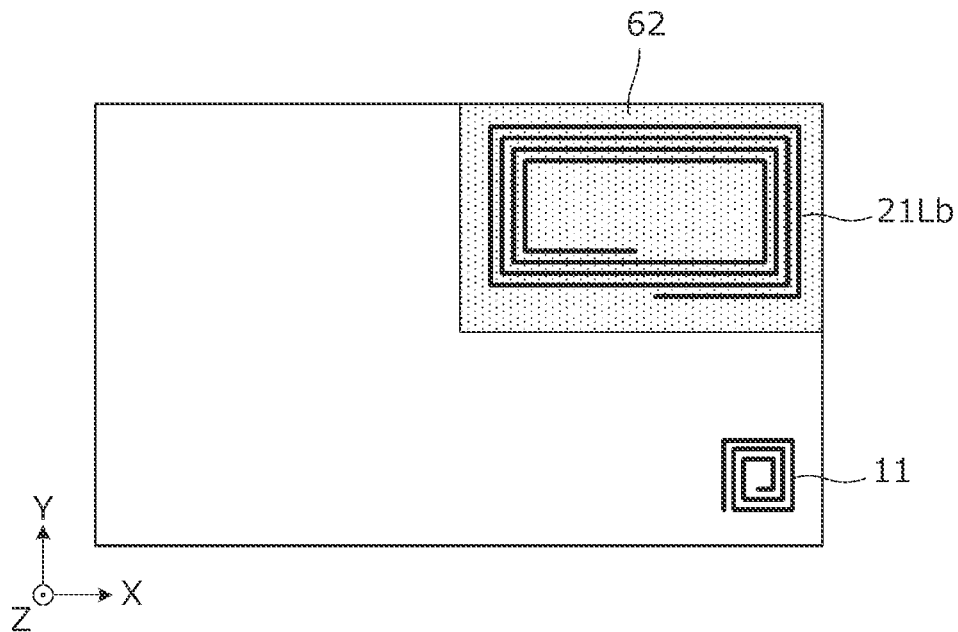

FIGS. 12A and 12B are each a view illustrating the configuration of a corresponding one of the receiving coils 21La and 21Lb and the communication antenna 11 each of which is included in the wireless power-receiving device with near field communication function according to the second embodiment, the configuration being for simulating a relationship between a location relationship of the communication antenna 11 with the receiving coil 21La or 21Lb and the coefficient of coupling k12 between the communication antenna 11 and the receiving coil 21La or 21Lb.

Figure 13:
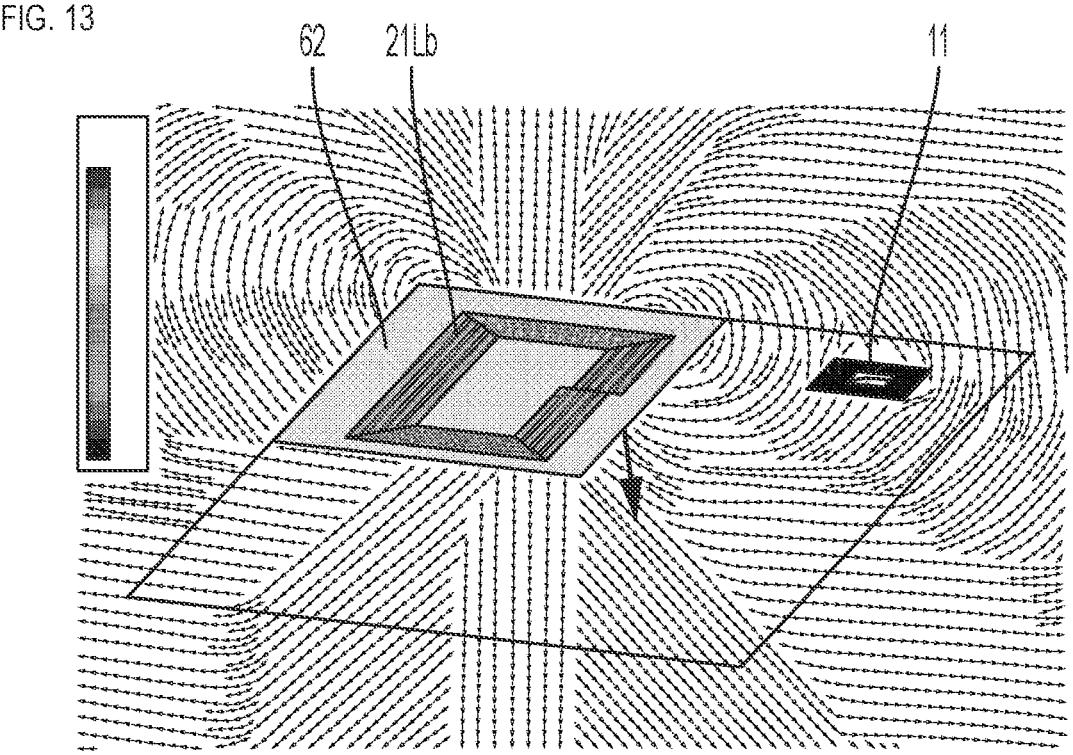
FIG. 13 is a view illustrating the direction of a magnetic field generated due to a current flowing through the receiving coil and the distribution of magnetic field intensity or the direction of the magnetic field and the distribution of the magnetic field intensity in a state where the magnetic flux interlinks with the coil aperture of the receiving coil.

FIG. 13 is a view illustrating the direction of a magnetic field generated due to a current flowing through the receiving coil 21Lb and the distribution of magnetic field intensity or the direction of the magnetic field and the distribution of the magnetic field intensity in a state where the magnetic flux interlinks with the coil aperture of the receiving coil 21Lb. As described above, since the receiving-coil magnetic sheet 62 acts as part of the magnetic path of the magnetic flux interlinking with the receiving coil 21Lb, the magnetic flux passing through the coil aperture of the receiving coil 21Lb is restrained from spreading, and thus the coefficient of coupling k12 between the communication antenna 11 and the receiving coil 21Lb is low.

Here, examples of respective inductances of the communication antenna 11 and the receiving coils 21La and 21Lb and the coefficient of coupling k12 therebetween at the time when magnetic substances with different magnetic permeabilities or the like are described. A real part $\mu'$ and an imaginary part $\mu''$ of a complex dielectric constant and a dielectric loss tangent $\tan \delta$ of each magnetic sheet are as follows.

First magnetic sheet: $\mu'$: =40; $\mu''$=0.9; and $\tan \delta$=0.0225
Second magnetic sheet: $\mu'$: =26; $\mu''$=0.6; and $\tan \delta$=0.023
Third magnetic sheet: $\mu'$: =52; $\mu''$=9.2; and $\tan \delta$=0.176

The specifications of the communication antenna 11 and the receiving coils 21La and 21Lb are those as described in the first embodiment.

Table 1 below describes examples of the self inductance of each of the receiving coils 21La and 21Lb, the mutual inductance between the communication antenna 11 and the receiving coils 21La and 21Lb, and the coefficient of coupling k12, in the use of the magnetic sheets described above.

TABLE 1

| receiving coil | magnetic sheet | self inductance [nH] | mutual inductance [nH] | k12 |
|---|---|---|---|---|
| 21La | nil | 1126 | 400 | 0.0037 |
| | first magnetic sheet | 1130 | 528 | 0.003 |
| | second magnetic sheet | 1134 | 499 | 0.0032 |
| | third magnetic sheet | 1131 | 551 | 0.0029 |
| 21Lb | nil | 1126 | 580 | 0.0037 |
| | first magnetic sheet | 1129 | 749 | 0.003 |
| | second magnetic sheet | 1135 | 711 | 0.0031 |
| | third magnetic sheet | 1132 | 780 | 0.0029 |

As expressed by the dot patterns in Table 1, the coefficients of coupling k12 between the communication antenna 11 and the receiving coils 21La and 21Lb without a magnetic sheet have the maximum value. That is, providing the receiving-coil magnetic sheet 62 can lead to reduction of the coefficient of coupling k12 between the communication antenna 11 and the receiving coils 21La and 21Lb.

Third Embodiment

In a third embodiment, a wireless power-receiving device with near field communication function including a magnetic substance near the communication antenna 11 will be described.

Figure 14:
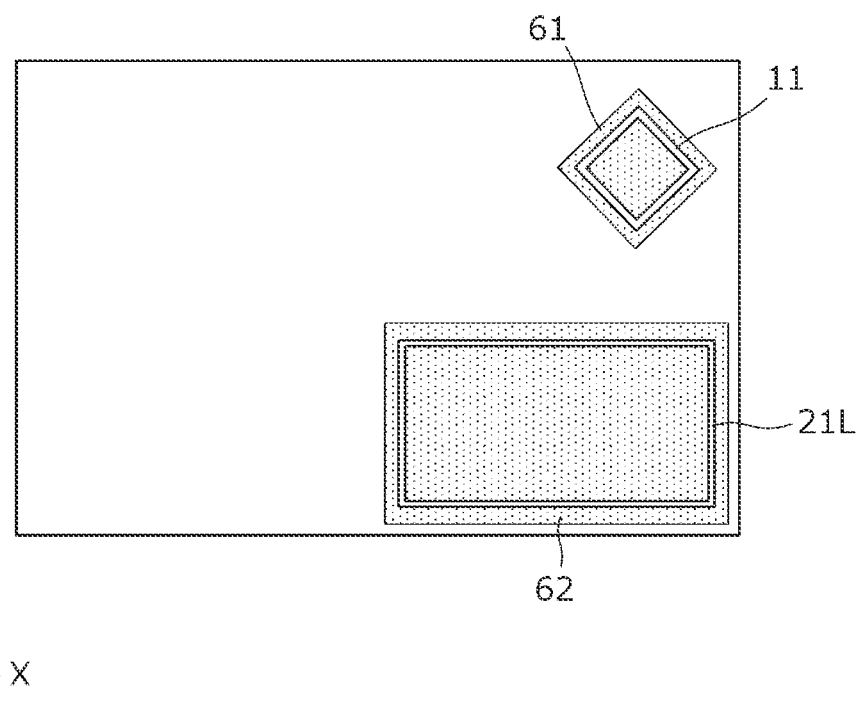
FIG. 14 is a plan view illustrating the structure of the communication antenna and the receiving coil included in a wireless power-receiving device with near field communication function according to a third embodiment.

FIG. 14 is a plan view illustrating the structure of the communication antenna and the receiving coil included in the wireless power-receiving device with near field communication function according to the third embodiment. In FIG. 14, the communication antenna 11 is a NFC communication antenna, and the receiving coil 21L is a receiving coil for wireless power receiving. The communication antenna 11 and the receiving coil 21L are laid on the flat surface. The communication antenna 11 is configured from a spiral square coil conductor wound with a plurality of turns. The receiving coil 21L is also configured from a spiral square coil conductor wound with a plurality of turns.

In the third embodiment, the receiving-coil magnetic sheet 62 is disposed in contact with the surface of the receiving coil 21L. In addition, a communication-antenna magnetic sheet 61 is disposed in contact with the surface of the communication antenna 11. In FIG. 14, the surface in the +Z direction faces the counterpart communication antenna 41 or the transmitting coil 51L. The communication-antenna magnetic sheet 61 and the receiving-coil magnetic sheet 62 are formed, for example, by shaping magnetic ferrite into a flexible sheet. The communication-antenna magnetic sheet 61 is not in contact with the receiving-coil magnetic sheet 62.

In the example illustrated in FIG. 14, the receiving coil 21L is a spiral coil shaped as a rectangular parallelepiped and having two sides extending in the X direction and two sides extending in the Y direction. The communication antenna 11 is a square spiral coil having four sides skewed (rotated) by an angle of 45 degrees with the X direction and the Y direction.

According to the structure illustrated in FIG. 14, since the receiving-coil magnetic sheet 62 acts as part of the magnetic path of a magnetic flux interlinking with the receiving coil 21L, the magnetic flux passing through the coil aperture of the receiving coil 21L is restrained from spreading, and thus the coefficient of coupling k12 between the communication antenna 11 and the receiving coil 21L is low. Further, in this embodiment, since the communication-antenna magnetic sheet 61 acts as part of the magnetic path of a magnetic flux interlinking with the communication antenna 11, the magnetic flux passing through the coil aperture of the communication antenna 11 is restrained from spreading, and thus the coefficient of coupling k12 between the communication antenna 11 and the receiving coil 21L is more effectively restrained from increasing.

In addition, since the receiving-coil magnetic sheet 62 acts as part of the magnetic path of the magnetic flux interlinking with the receiving coil 21L, the coefficient of coupling between the receiving coil 21L and the counterpart communication antenna 41 (FIG. 2) or the coefficient of coupling k2 (FIG. 8) between the receiving coil 21L and the transmitting coil 51L is improved. Further, since the communication-antenna magnetic sheet 61 acts as part of the magnetic path of the magnetic flux interlinking with the communication antenna 11, a coefficient of coupling between the communication antenna 11 and the counterpart communication antenna 41 (FIG. 2) or the coefficient of coupling k1 between the communication antenna 11 and the transmitting coil 51L (FIG. 8) is improved.

Since the communication antenna 11 and the receiving coil 21L are in the relationship of skewing (rotation) by the angle of 45 degrees on the flat surface in this embodiment, the conductive pattern of the communication antenna 11 is not parallel to the conductive pattern of the receiving coil 21L. The coefficient of coupling k12 between the communication antenna 11 and the receiving coil 21L is thus low. In addition, since a corner portion of the conductive pattern of the communication antenna 11 faces the receiving coil 21L, flux density between the communication antenna 11 and the receiving coil 21L is relatively low. The coefficient of coupling between the communication antenna 11 and the receiving coil 21L is thus low.

Fourth Embodiment

In a fourth embodiment, a wireless power-receiving device with near field communication function in which a location relationship between a communication antenna and a receiving coil is different from that of each example described so far will be described.

Figure 15:
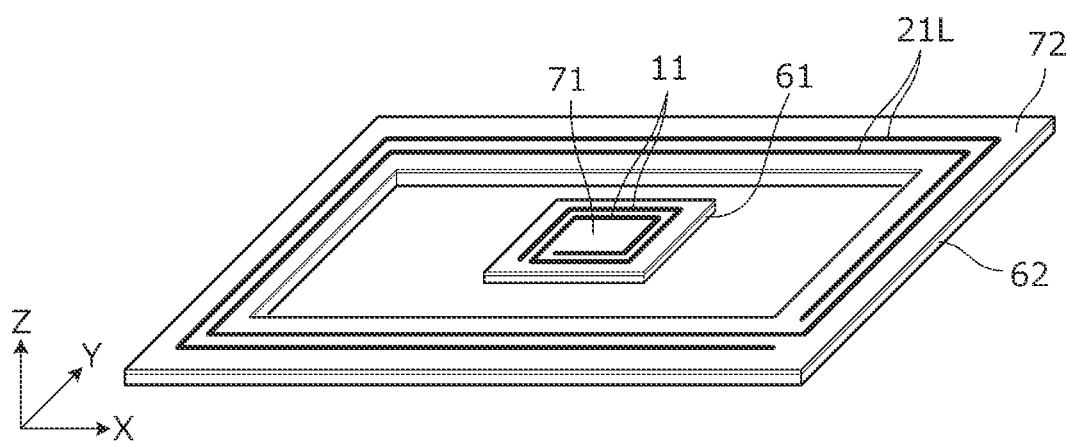
FIG. 15 is a perspective view illustrating the structure of a communication antenna and a receiving coil included in a wireless power-receiving device with near field communication function according to a fourth embodiment.
Figure 16:
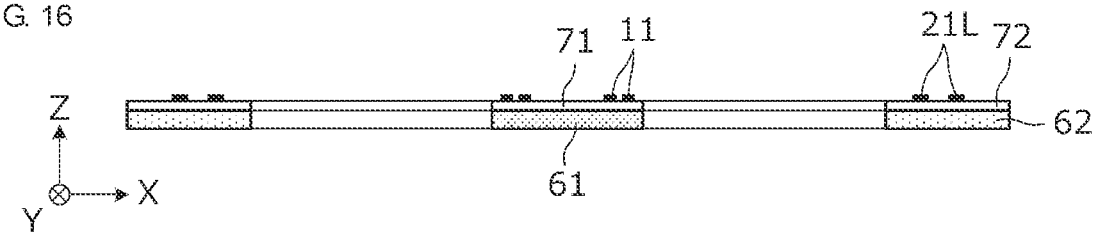
FIG. 16 is a cross-sectional view of the structure of the communication antenna and the receiving coil illustrated in FIG. 15.

FIG. 15 is a perspective view illustrating the structure of the communication antenna and the receiving coil included in the wireless power-receiving device with near field communication function according to the fourth embodiment. FIG. 16 is a cross-sectional view of the structure of the communication antenna and the receiving coil illustrated in FIG. 15.

The fourth embodiment includes a receiving-coil substrate 72 on which a receiving coil 21L is formed, a receiving-coil magnetic sheet 62, a communication-antenna substrate 71 on which a communication antenna 11 is formed, and a communication-antenna magnetic sheet 61. The receiving-coil substrate 72 is of a rectangular frame shape, and the communication-antenna substrate 71 is of a square shape. The receiving-coil magnetic sheet 62 overlaps with the receiving-coil substrate 72, and the communication antenna 11 overlaps with the communication-antenna substrate 71.

The receiving coil 21L and the communication antenna 11 are disposed in a coaxial relationship. According to this configuration, since the receiving-coil magnetic sheet 62 acts as part of the magnetic path of a magnetic flux interlinking with the receiving coil 21L, the magnetic flux passing through the coil aperture of the receiving coil 21L is restrained from spreading. In addition, since the communication-antenna magnetic sheet 61 acts as part of the magnetic path of a magnetic flux interlinking with the communication antenna 11, the magnetic flux passing through the coil aperture of the communication antenna 11 is restrained from spreading. The coefficient of coupling k12 between the communication antenna 11 and the receiving coil 21L (FIG. 8) is thus low. In addition, the receiving-coil magnetic sheet 62 acts as part of the magnetic path of the magnetic flux interlinking with the receiving coil 21L, the coefficient of coupling between the receiving coil 21L and the counterpart communication antenna 41 (FIG. 2) is high. Likewise, a coefficient of coupling between the communication antenna 11 and a communication circuit (for example, the NFC communication circuit 42 in FIG. 2) is also high.

Note that in the example illustrated in FIGS. 15 and 16, the receiving-coil substrate 72 and the communication-antenna substrate 71 are separate but may be configured as an integrated substrate. However, also in the case, the receiving-coil magnetic sheet 62 is preferably of a frame shape to follow the outline of the receiving coil 21L. The magnetic path of the magnetic flux for power receiving is thereby isolated from the magnetic path of the magnetic flux for the near field communication interlinking with the communication antenna 11.

Lastly, the embodiments described above are examples in all respects and are not restrictive. Modifications and changes may be appropriately made for those skilled in the art. The scope of the present disclosure is defined by the scope of claims, not by the embodiments above. Further, the scope of the present disclosure includes a change made from the embodiments in the scope equivalent to the scope of claims.

For example, the present disclosure is not limited to the card electronic device and is applicable to various electronic devices such as a mobile phone terminal such as a smartphone or a feature phone, a wearable terminal such as a smart watch or smart glasses, a mobile PC such as a note PC or a tablet PC, an information apparatus such as a camera, a gaming machine, or a toy, and an information medium such as an IC tag or an IC card.

What is claimed is:

1. A wireless power-receiving device with near field communication function, comprising:

a communication antenna configured for near field communication when on a flat surface;
an interface circuit that is connected to the communication antenna and that is configured to allow a signal in the near field communication to pass;
a wireless communication IC that is connected to the interface circuit and that is configured to process the signal in the near field communication;
a receiving coil configured for placement on the flat surface;
a resonant capacitor included, together with the receiving coil, in a receiving resonant circuit; and
a rectifying/smoothing circuit connected to the receiving resonant circuit,
wherein
the receiving resonant circuit resonates at a frequency for the near field communication,
a resonance current flowing through the receiving resonant circuit causes a current to flow through the receiving coil, a main flux is generated near the receiving coil, and a magnetic path of the main flux is isolated from a magnetic path of a magnetic flux for the near field communication, the magnetic flux interlinking with the communication antenna, and
a coefficient of coupling k12 between the receiving coil and the communication antenna is lower than a coefficient of coupling k2 between the communication antenna and another communication antenna coupled to the communication antenna.

2. The wireless power-receiving device with near field communication function according to claim 1, wherein
an impedance of the receiving resonant circuit at the frequency for the near field communication is ½ or less of an impedance of the interface circuit at the frequency for the near field communication.

3. The wireless power-receiving device with near field communication function according to claim 1, wherein
the communication antenna and the receiving coil are disposed on the flat surface, and
the communication antenna is disposed outward of a winding area of the receiving coil.

4. The wireless power-receiving device with near field communication function according to claim 1, wherein
the communication antenna is disposed a distance away from the receiving coil, the distance being longer than or equal to a distance between the receiving coil and a transmitting coil coupled to the receiving coil.

5. The wireless power-receiving device with near field communication function according to claim 1, wherein
the communication antenna and the receiving coil each have a plurality of sides, and the communication antenna is disposed in a relationship in which the sides of the communication antenna are not parallel to the sides of the receiving coil.

6. The wireless power-receiving device with near field communication function according to claim 1, comprising:
a magnetic sheet disposed near the receiving coil and configured to receive power and establish the magnetic path of the main flux.

7. The wireless power-receiving device with near field communication function according to claim 1, comprising:
a magnetic sheet disposed near the communication antenna and configured for communication and to establish a magnetic path isolated from the magnetic path of the main flux.

8. The wireless power-receiving device with near field communication function according to claim 1, comprising:
a secondary battery configured to function as a power supply for the wireless communication IC; and
a charging circuit configured to charge the secondary battery by using a voltage from the rectifying/smoothing circuit.

9. The wireless power-receiving device with near field communication function according to claim 1, wherein
the coefficient of coupling k12 between the receiving coil and the communication antenna is lower than a coefficient of coupling k1 between the receiving coil and a transmitting coil coupled to the receiving coil.

10. The wireless power-receiving device with near field communication function according to claim 2, wherein
the communication antenna and the receiving coil are disposed on the flat surface, and
the communication antenna is disposed outward of a winding area of the receiving coil.

11. The wireless power-receiving device with near field communication function according to claim 2, wherein
the communication antenna is disposed a distance away from the receiving coil, the distance being longer than or equal to a distance between the receiving coil and a transmitting coil coupled to the receiving coil.

12. The wireless power-receiving device with near field communication function according to claim 3, wherein
the communication antenna is disposed a distance away from the receiving coil, the distance being longer than or equal to a distance between the receiving coil and a transmitting coil coupled to the receiving coil.

13. The wireless power-receiving device with near field communication function according to claim 2, wherein
the communication antenna and the receiving coil each have a plurality of sides, and the communication antenna is disposed in a relationship in which the sides of the communication antenna are not parallel to the sides of the receiving coil.

14. The wireless power-receiving device with near field communication function according to claim 3, wherein
the communication antenna and the receiving coil each have a plurality of sides, and the communication antenna is disposed in a relationship in which the sides of the communication antenna are not parallel to the sides of the receiving coil.

15. The wireless power-receiving device with near field communication function according to claim 4, wherein
the communication antenna and the receiving coil each have a plurality of sides, and the communication antenna is disposed in a relationship in which the sides of the communication antenna are not parallel to the sides of the receiving coil.

16. The wireless power-receiving device with near field communication function according to claim 2, comprising:
a magnetic sheet disposed near the receiving coil and configured to receive power and establish the magnetic path of the main flux.

17. The wireless power-receiving device with near field communication function according to claim 3, comprising:
a magnetic sheet disposed near the receiving coil and configured to receive power and establish the magnetic path of the main flux.

18. The wireless power-receiving device with near field communication function according to claim 2, comprising:
a magnetic sheet disposed near the communication antenna and configured for communication and to establish a magnetic path isolated from the magnetic path of the main flux.

19. The wireless power-receiving device with near field communication function according to claim 2, comprising:
- a secondary battery configured to function as a power supply for the wireless communication IC; and
- a charging circuit configured to charge the secondary battery by using a voltage from the rectifying/smoothing circuit.

20. The wireless power-receiving device with near field communication function according to claim 2, wherein
- the coefficient of coupling k12 between the receiving coil and the communication antenna is lower than a coefficient of coupling k1 between the receiving coil and a transmitting coil coupled to the receiving coil.

\* \* \* \* \*